United States Patent [19]

Shimaoka et al.

[11] Patent Number: 4,570,196
[45] Date of Patent: Feb. 11, 1986

[54] CARTRIDGE LOADING APPARATUS WITH RETRACTABLE EJECT BUTTON

[75] Inventors: Motohiro Shimaoka; Yukio Saito, both of Furukawa, Japan

[73] Assignee: Alps Electric Co., Ltd., Tokyo, Japan

[21] Appl. No.: 564,304

[22] Filed: Dec. 22, 1983

[30] Foreign Application Priority Data

Dec. 22, 1982 [JP] Japan .......................... 57-193107[U]

[51] Int. Cl.⁴ ........................................... G11B 5/012
[52] U.S. Cl. .................................................... 360/97
[58] Field of Search ................ 360/90, 93, 96.1, 96.5, 360/97, 88

[56] References Cited

U.S. PATENT DOCUMENTS 4,257,075  3/1981  Wysocki et al. .................. 360/96.5
4,303,955  12/1981  Kramer et al. ..................... 360/96.5

Primary Examiner—John H. Wolff
Attorney, Agent, or Firm—Guy W. Shoup

[57] ABSTRACT

A recording/reproducing device has an eject button projectable from an opening in a frame for operating a cam for returning a cartridge holder from a loaded state to the state before loading through a disc cartridge insertion opening, the eject button and the disc cartridge insertion opening being disposed in parallel with each other in a frame. The eject button is not projected from the frame when the cartridge holder is in the state before loading, and it is projected from the frame when the cartridge holder assumes the loaded state. The insertion of the disc cartridge into the cartridge holder can be done smoothly.

5 Claims, 3 Drawing Figures

CARTRIDGE LOADING APPARATUS WITH RETRACTABLE EJECT BUTTON

BACKGROUND OF THE INVENTION (1) Field of the Invention:

The present invention relates to a recording/reproducing device using a disc cartridge.

(2) Description of the Prior Art:

Recently, there has been developed a recording/reproducing device of the type in which a magnetic disc is rotatably enclosed in a disc cartridge formed of a hard material, then this disc cartridge is inserted into the recording/reproducing device and is capable of performing recording and playback in a loaded state. In this type of a recording/reproducing device, a cartridge insertion opening for inserting a disc cartridge into a cartridge holder mounted in the device, and an eject button operative to return the cartridge holder to the state before loading so that the disc cartridge can be taken out from the cartridge holder, are disposed in parallel with each other on the same side of a frame. Consequently, at the time of insertion of the disc cartridge into the cartridge insertion opening, the eject button strikes against the operator's hand and finger and thus impedes the inserting operation.

SUMMARY OF THE INVENTION

It is the object of the present invention to provide a recording/reproducing device which can eliminate the above-mentioned drawbacks of the prior art and which permits a smooth insertion of a disc cartridge into a cartridge holder.

In order to achieve the above object of the present invention, the recording/reproducing device of the present invention is characterized in that while the cartridge holder is in the state before loading, the eject button is not projected from the frame, and when the cartridge holder assumes the loaded state, the eject button is projected from the frame.

DESCRIPTION OF A PREFERRED EMBODIMENT

Figure 1:
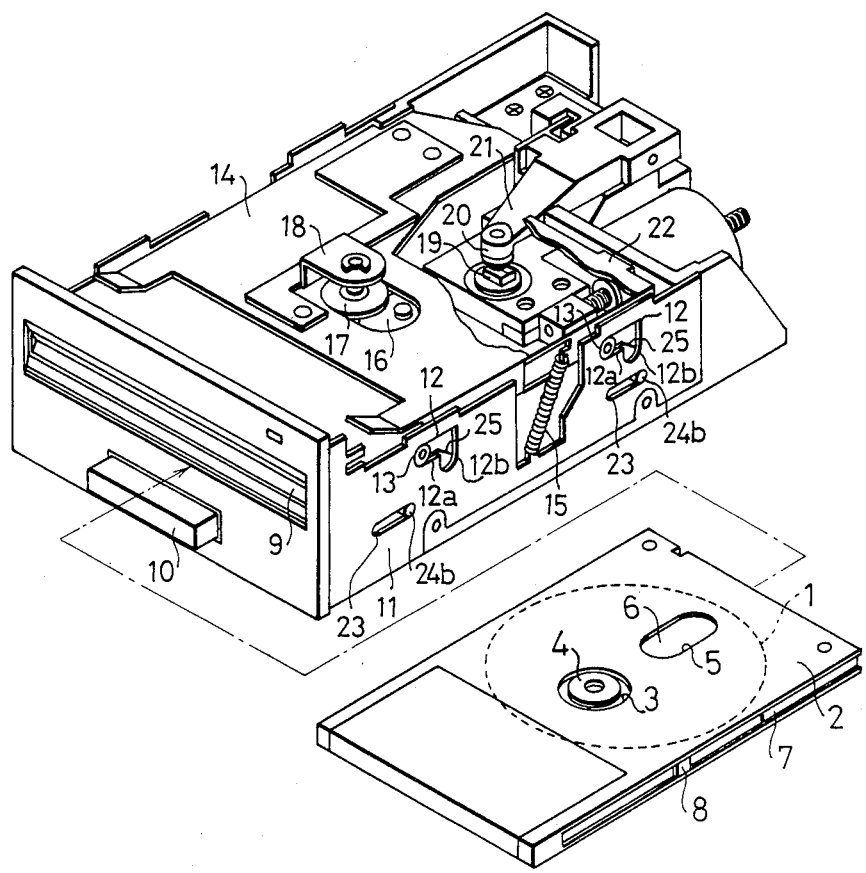
FIG. 1 is a schematic perspective view of a recording/reproducing device according to an embodiment of the present invention.

An embodiment of the present invention will be described hereinunder with reference to the accompanying drawings.

A magnetic disc 1 is rotatably enclosed in a disc cartridge 2 formed of a hard synthetic resin; a hub 4 which centrally holds the magnetic disc 1 is exposed through hole 3 formed centrally in the cartridge 2; and a shutter 6 which comprises a metallic plate is pivotably disposed under a magnetic head insertion aperture 5 which is formed in a predetermined position of the cartridge 2. The disc cartridge 2 has grooves 7 formed in both side portions thereof. In one groove 7 is slidably disposed a shutter operating portion 8 for the shutter 6.

On the other hand, an insertion opening for the cartridge 2 and an eject button 10 are provided at the front frame portion of the recording/reproducing device.

Figure 2:
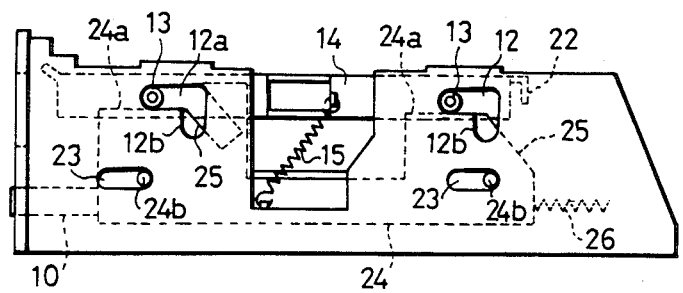
FIG. 2 is a side view showing principal components thereof in a non-operating state.
Figure 3:
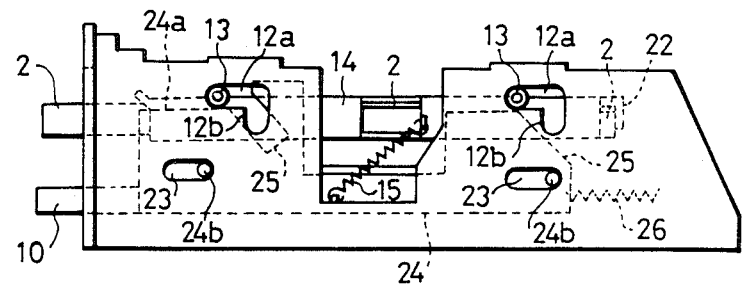
FIG. 3 is a side view showing principal components thereof in an operating state.

Behind the cartridge insertion opening 9 is disposed a cartridge holder 14. The cartridge holder 14 is provided at side portions thereof with rollers 13 which are guided along inverted L-shaped slots formed in both side portions of a frame 11. The cartridge holder 14 is urged downward in the front frame direction at all times by means of a tension spring 15 fixed to the frame 11. While the cartridge 2 is not inserted into the cartridge holder 14, the roller 13 is held in the fore end position of a horizontal portion 12a of the inverted L-shaped slot 12 by means of the tension spring 15, as shown in FIG. 2. On the front upper portion of the cartridge holder 14, as shown in FIG. 1, there is mounted a receiving portion 18 for a pressing portion 17 for pressing the hub 4 of the magnetic disc 1 against a turntable 16, while on the rear upper surface of the cartridge holder 14 there is formed, in opposed relation to a magnetic head 19, an abutting portion for pushing up an arm 21 with a pad 20 attached thereto when the roller 13 of the cartridge holder 14 is located in the horizontal portion 12a of the inverted L-shaped slot 12. Further, at the rear end of the cartridge holder 14 is formed a bent portion 22 for abutment with the fore end of the cartridge 2.

To the eject button 10 is connected a push-up cam 24 provided at side portions thereof with pins 24b which are guided by slots 23 formed in the side portions of the frame 11. The cam 24 is formed with an inclined portion 25 which can abut the roller 13 in a vertical portion 12b of the inverted L-shaped slot 12. In the state before loading of the cartridge holder 14 as shown in FIG. 2, the cam 24 is urged rearwardly of the frame 11 by a spring 25 fixed to the frame 11 so that a part of a flat portion 24a of the cam 24 is positioned in the vertical portion 12b, thereby preventing the fore end of the eject button 10 from projecting largely from the front frame portion of the frame 11. The biasing force of the spring 26 is weaker than that of the tension spring 15 for the reason as will be stated later.

Therefore, at the time of insertion of the cartridge 2 from the cartridge insertion opening 9, the eject button 10 does not cause an obstacle to the inserting operation. When the cartridge 2 is inserted into the cartridge holder 14 and its fore end pushes the bent portion 22 of the cartridge holder 14, the cartridge holder 14 moves to the right in the drawings, and when the center of the roller 13 is biased from the flat portion 24a to the inclined portion 25 of the cam 24, a force which urges the inclined portion 25 to the left through the roller 13 is induced by the tension spring 15. At this time, since the biasing force of the spring 26 is smaller than that of the tension spring 15 as mentioned above, the cam 24 moves to the left against the spring 26, the roller 13 moves to the lower part of the vertical portion 12b, and the cartridge holder 14 is also forced down and assumes the loaded state, whereupon the hub 4 of the magnetic disc 1 is urged against the turntable 16 by the pressing portion 17 attached to the cartridge holder 14, and the magnetic disc 1 is now ready to rotate. On the other hand, since the shutter is kept open by being operated with an opening/closing pin (not shown) disposed in the vicinity of the cartridge insertion opening 9, that is, the magnetic head insertion aperture 5 of the cartridge 2 is open, the pad 20 attached to the fore end of the arm 21 descends as the cartridge holder 14 is forced down, whereby the magnetic disc 1 is urged against the magnetic head 19, now ready for recording and playback. At this time, the eject button 10 is largely projected forward from the front frame portion of the frame 11 by the leftward movement of the cam 24.

For returning the cartridge holder from the loaded state to the state before loading, the eject button 10 is pushed inwards, whereupon the inclined portion 25 of the push-up cam 24 pushes up the lower portion of the roller 13 which is positioned in the lower part of the vertical portion 12 of the inverted L-shaped slot 12, so that the roller 13 goes up while being held by the inclined portion 25 and the vertical portion 12b of the inverted L-shaped slot 12. When the roller 13 reaches the horizontal portion 12a, it is no longer in abutment with the inclined portion 25, so the roller 13 is moved to the fore end of the horizontal portion 12a. With this movement of the roller 13, the cartridge holder 14 also moves upward toward the cartridge insertion opening 9 and assumes the state before loading. At this time, since the cam 24 again moves to the right by virtue of the bias of the spring 26, the eject button 10 also returns to the original position.

According to the recording/reproducing device of the present invention having the above-described construction, when the cartridge holder is in the state before loading, the eject button can be prevented from projecting from the frame to the extent of impeding the disc cartridge inserting operation, whereby the insertion of the disc cartridge can be done smoothly.

What is claimed is:

1. A cartridge loading apparatus comprising a frame, a cartridge insertion opening leading in to a cartridge holder in said frame, an eject button projectable from a second opening in said frame for ejecting a cartridge loaded in said cartridge holder from a loaded state to an unloaded state when depressed, said eject button being disposed in parallel with said cartridge insertion opening, and a cam biased by biasing means in a rearward direction of said frame and having a member abutting a portion of said cartridge holder so as to be movable forwardly in said frame upon insertion of a cartridge in said cartridge holder, wherein said cam is connected to said eject button such that said eject button is retracted when said cartridge holder is unloaded and moves said eject button forwardly to project from said second opening when said cartridge holder is loaded with a cartridge.

2. A cartridge loading apparatus as described in claim 1, wherein said member of said cartridge holder is a roller positioned in a substantially inverted L-shaped slot formed in a side portion of said frame, and said cam has an inclined portion abutting said roller such that when said roller is moved downwardly in said inverted L-shaped slot by the loading of a cartridge in said cartridge holder, said abutting inclined portion causes movement of said cam forwardly to project said eject button from said second opening, wherein said eject button may be depressed to unload said cartridge from the loaded state.

3. A cartridge loading apparatus as described in claim 1, wherein said cam has pins projecting from side portions thereof, and said pins are guided for movement of said cam by slots formed in side portions of said frame.

4. A cartridge loading apparatus as described in claim 1, wherein said cartridge holder is urged in a forward and downward direction of said frame by means of a tension spring.

5. A cartridge loading apparatus as described in claim 4, wherein the urging force of said tension spring is stronger than the biasing force biasing said cam in the rearward direction of said frame.

* * * * *